United States Patent [19]

Katayama et al.

[11] Patent Number: 5,011,392
[45] Date of Patent: Apr. 30, 1991

[54] DRAIN EJECTOR IN A TIRE VULCANIZING MACHINE

[75] Inventors: Hideaki Katayama; Toshifumi Murakami, both of Nagasaki; Koji Soeda, Kobe; Yoshiya Kubota; Shoji Okamoto, both of Toyota; Akinori Kubota, Kobe; Michihito Kobayashi, Toyota; Masaaki Ijiri, Aichi, all of Japan

[73] Assignees: Mitsubishi Jukogyo Kabushiki Kaisha, Tokyo; Sumitomo Rubber Industries Ltd., Hyogo, both of Japan

[21] Appl. No.: 487,250

[22] Filed: Mar. 2, 1990

[30] Foreign Application Priority Data

Mar. 2, 1989 [JP] Japan .................................. 1-48558

[51] Int. Cl.⁵ .................... B29C 33/02; B29C 35/02
[52] U.S. Cl. ..................................... 425/35; 425/40; 425/42; 425/58; 425/383
[58] Field of Search ..................... 425/383, 23, 33, 35, 425/36, 45, 49, 50, 51, 52, 53, 58, 40, 28.1, 42

[56] References Cited

U.S. PATENT DOCUMENTS

| | | | |
|---|---|---|---|
| 1,798,210 | 3/1931 | Laursen | 425/36 |
| 1,982,674 | 12/1934 | Laursen | 425/36 |
| 2,025,992 | 12/1935 | Laursen | 425/36 |
| 3,008,180 | 11/1961 | Woodhall | 425/38 |
| 3,052,920 | 9/1962 | Harris | 425/33 |
| 3,645,660 | 2/1972 | Hugger et al. | 425/445 |
| 3,667,881 | 6/1972 | Cimprich | 425/28 |
| 3,793,420 | 2/1974 | Fredricks et al. | 425/58 |

FOREIGN PATENT DOCUMENTS

| | | |
|---|---|---|
| 177101 | 4/1986 | European Pat. Off. |
| 686073 | 12/1939 | Fed. Rep. of Germany |
| 739348 | 8/1943 | Fed. Rep. of Germany |
| 57-88532 | 11/1955 | Japan |
| 57-70632 | 5/1982 | Japan |
| 58-133418 | 9/1983 | Japan |
| 62-1913 | 1/1987 | Japan |
| 63-280604 | 11/1988 | Japan |

Primary Examiner—Willard E. Hoag
Attorney, Agent, or Firm—Wenderoth, Lind & Ponack

[57] ABSTRACT

An ejector in a tire vulcanizing machine for ejecting the condensate of vulcanizing steam accumulated within a bladder to the outside of a tire includes a drain extraction pipe elevatably and rotatably supported in the machine and extending through a lower ring and a guide ring for clamping a lower edge portion of the bladder, a drain suction pipe extending horizontally from the top end portion of the drain extraction pipe and having its tip end portion bent downwards, an elevation drive and a rotary drive for the drain extraction pipe, and a rotary limit adjusting mechanism provided in the rotary drive. Preferably, the rotary drive is made up of a rotary shaft of a rotary cylinder mounted to the bottom end portion of the drain extraction pipe so as to be supported in an axially movable manner and a body of the rotary cylinder surrounding the rotary shaft. The rotary limit adjusting mechanism is made up of an inner gear mounted to the body and an outer gear mounted to a bracket on the side of a main body frame. Also, preferably, a rear end portion of the drain suction pipe is mounted to the top end portion of the drain extraction pipe in a manner which enables the drain suction pipe to swing up and down about a horizontal axis.

4 Claims, 10 Drawing Sheets

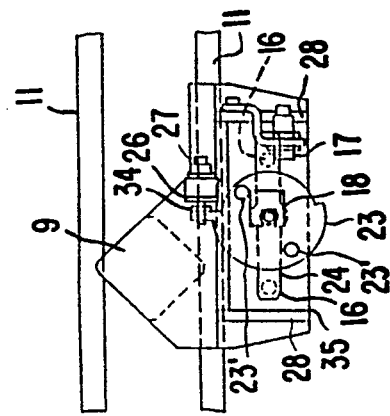
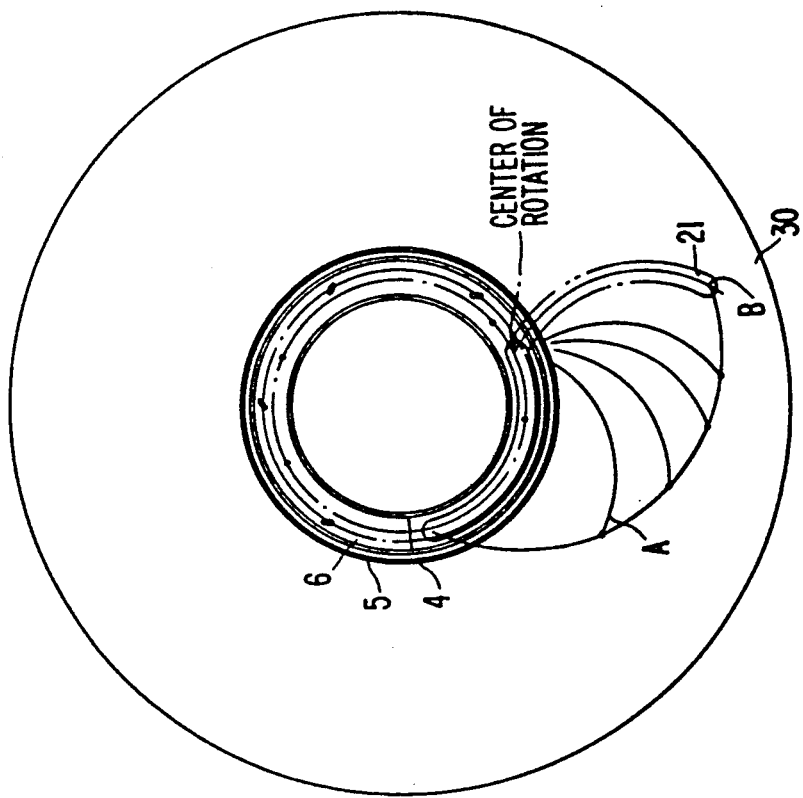

DRAIN EJECTOR IN A TIRE VULCANIZING MACHINE

BACKGROUND OF THE INVENTION

1. Field of the invention:

The present invention relates to a drain ejector in a tire vulcanizing machine for ejecting vulcanizing steam accumulated within a bladder.

2. Description of the Prior Art:

A drain ejector in a tire vulcanizing machine, which is adapted to place the inside of a bladder in communication with the outside of metal molds through a drain flow passageway and to eject the condensate of vulcanizing steam, that is, the condensate of vulcanizing steam produced during vulcanization of a tire, and which has accumulated in a lower side wall portion of a bladder, from the inside of the bladder through the drain flow passageway to the outside of the upper and lower metal molds by means of the pressure within the bladder, has been heretofore known (Japanese Utility Model Application No. 60-92217 (1985)).

A drain ejector is provided in a tire vulcanizing machine for the following reasons:

(I) Upon vulcanization of a tire, if the condensate vulcanizing steam accumulates within a bladder, a temperature difference is produced by the condensate between upper and lower portions of a tire, and it is necessary to prolong a vulcanization time in view of safety. However, if an ejector is provided in a tire vulcanizing machine, it is possible to eject the condensate of vulcanizing steam accumulated in a lower side wall portion of a bladder to the outside of the metal molds. Hence, a temperature difference is not produced between upper and lower portions of a tire and a vulcanization time can be shortened, and at the same time the upper and lower side wall portions are uniformly vulcanized, resulting in improvement in the quality of the tires.

(II) In addition, during vulcanization of a tire, if the condensate of vulcanizing steam were not ejected from the inside of a bladder to the outside of metal molds, the condensate of vulcanizing steam would reevaporate within the bladder, and stripping resistance of the bladder would increase. In this respect, if an air ejector is provided in a tire vulcanizing machine, the condensate of vulcanizing steam accumulated in a lower side wall portion of a bladder during vulcanization of a tire can be ejected to the outside of the metal molds, and hence a stripping resistance of the bladder is reduced.

However, the above-described condensate ejector in a vulcanizing machine in the prior art presents the following problems. That is, unless a suction port of a drain outflow passageway is positioned at the deepest portion of a side wall, the condensate of vulcanizing steam cannot be ejected thoroughly from the inside of a bladder. In the above-described condensate ejector in a tire vulcanizing machine, a suction port of a drain outflow passageway is fixed in position. On the other hand, the sizes of tires to be vulcanized in a vulcanizing machine are not constant but vary. Hence, in the case where the sizes of the tires to be vulcanized change, a suction port of the drain outflow passageway cannot be positioned at the deepest portion of the side wall of the tire, and so, a problem arises in that the condensate of vulcanizing steam cannot be ejected thoroughly from the inside of a bladder.

SUMMARY OF THE INVENTION

The present invention has been developed in view of the above-described problems in the prior art, and it is one object of the present invention to provide a novel condensate ejector in a vulcanizing machine, in which even if the sizes of the tires change, a suction port of a drain outflow passageway can be positioned at the deepest portion of the side wall of the tire, whereby the condensate vulcanizing steam can be ejected thoroughly from the inside of a bladder.

According to one feature of the present invention, there is provided an ejector in a tire vulcanizing machine for ejecting the condensate of vulcanizing steam accumulated within a bladder to the outside of a tire, comprising a drain extraction pipe elevatably and rotatably supported in the machine and extending through a lower ring and a guide ring for clamping a lower edge portion of the bladder, a drain suction pipe extending horizontally from the top end portion of the drain extraction pipe and having its tip end portion bent downwards, elevation drive means and rotary drive means for the drain extraction pipe, and a rotary limit adjusting device provided in the rotary drive means.

According to another feature of the present invention, there is provided the above-featured ejector in a vulcanizing machine, wherein the rotary drive means comprises a rotary shaft of a rotary cylinder mounted to the bottom end portion of the drain extraction pipe in an axially movable manner and a body of the rotary cylinder surrounding the rotary shaft, and the rotary limit adjusting device comprises an inner gear mounted to the body and an outer gear mounted to a bracket on the side of a main body frame via an elevator mechanism.

According to still another feature of the present invention, there is provided the above-featured ejector in a vulcanizing machine, wherein a rear end portion of the drain suction pipe is mounted to the top end portion of the drain extraction pipe so as to be able to swing up and down about a horizontal axis.

In the tire vulcanizing machine according to the present invention, when a lower metal mold is fixed on a main body frame, an upper metal mold is pressed from above, a tire is positioned within the upper and lower metal molds, a bladder is positioned within the tire, vulcanizing steam and pressurizing/vulcanizing gas is introduced into the bladder, such that vulcanization of the tire is commenced, a drain suction pipe is located at an inwardly rotated position with respect to a drain extraction pipe (at an accommodated position). Starting from this condition, the elevation drive means is actuated to raise the drain extraction pipe and drain suction pipe. Subsequently, the rotary drive means (rotary cylinder) is driven to rotate a rotary shaft of the rotary cylinder, and the drain extraction pipe and the drain suction pipe rotate up to a rotary limit of the rotary drive means (rotary cylinder). Thereafter, an adjustment is effected in which these members are set to desired positions. Next, the elevation drive means is actuated to lower the drain extraction pipe and the drain suction pipe, whereby a suction port of the drain suction pipe is positioned at the deepest portion of the side wall of the tire, and the condensate of vulcanizing steam produced within the bladder is ejected to the outside of the bladder through the drain suction pipe and the drain extraction pipe. Therefore, even if the sizes of the tires change, a suction port of a drain suction pipe can be positioned at the deepest portion of the side wall of the tire, and so, there is an advantage in that condensate of vulcanizing steam can be ejected thoroughly from the inside of a bladder.

The above-mentioned and other objects, features and advantages of the present invention will become more apparent by referring to the following description of one preferred embodiment of the invention taken in conjunction with the accompanying drawings.

BRIEF DESCRIPTION OF THE DRAWINGS

In the accompanying drawings:

FIG. 3(A) is a plan view taken along line III-III in FIG. 1;

FIG. 3(B) is a plan view as viewed in the direction of arrow III' in FIG. 1;

DESCRIPTION OF THE PREFERRED EMBODIMENT

Figure 1:
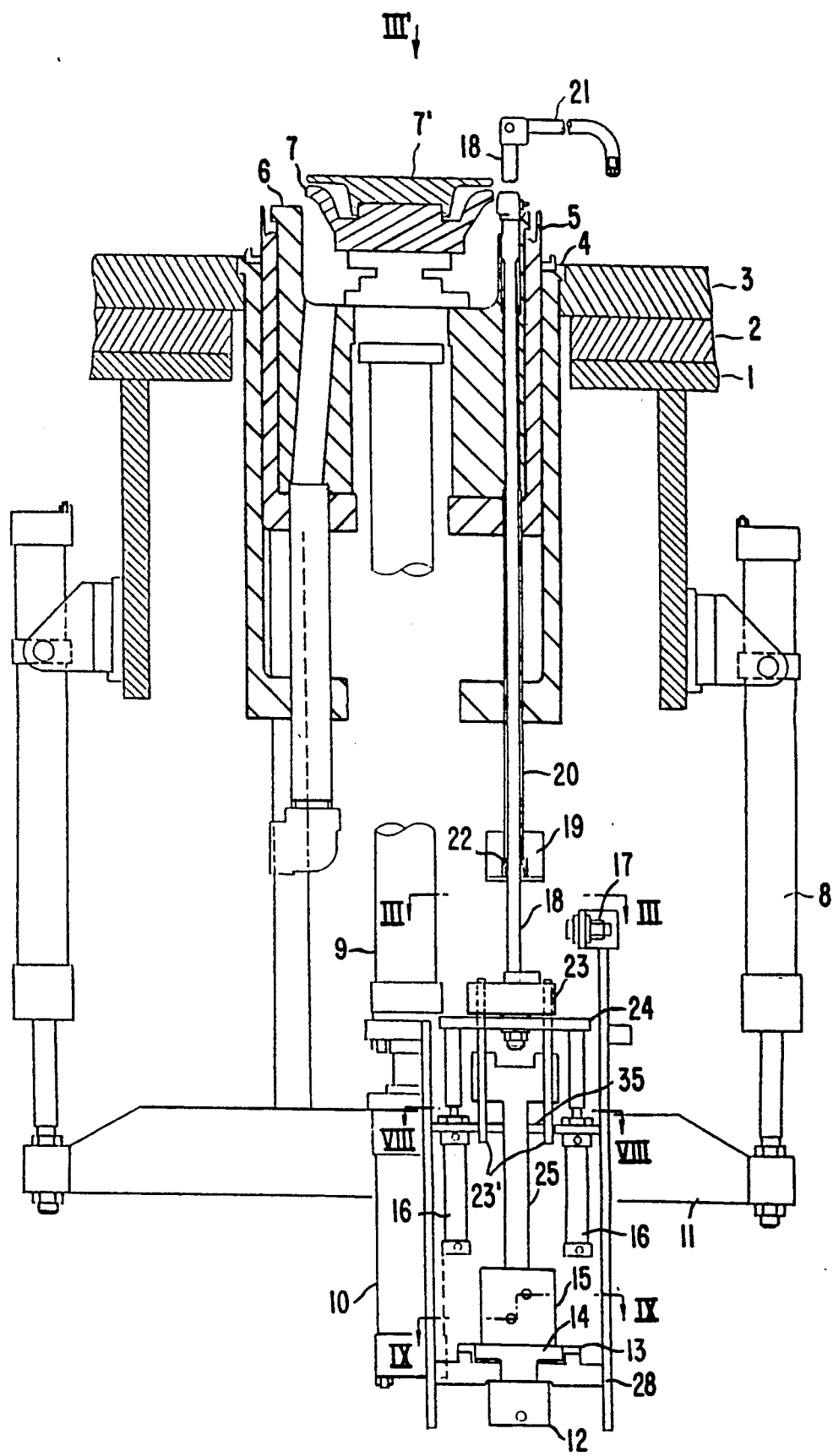
FIG. 1 is a side view, partly in section, of one preferred embodiment of a drain ejector in a vulcanizing machine according to the present invention.

Now the drain ejector in a tire vulcanizing machine according to the present invention will be described in more detail in connection with one preferred embodiment illustrated in FIGS. 1 through 11. FIG. 1 shows a lower portion of a tire vulcanizing machine.

In FIGS. 1, 4–7 and 11, reference numeral 1 designates a main body frame. To this main body from 1 are fixedly secured a heat insulator plate 2 and a platen 3. An outer cylinder 4 is supported by the platen 3 as suspended therefrom. A guide ring 5 is slidably fitted in the outer cylinder 4, and within the guide ring 4 is slidably fitted a lower ring 6. In addition, reference numeral 8 designates cylinders for elevating and lowering the guide ring and the lower ring, which are fixedly secured to the main body frame as suspended therefrom. Reference numeral 11 in FIGS. 1 and 3(A) designates a pair of frames fixedly secured to the bottom end portions of piston rods of the respective elevating/lowering cylinders 8. To the respective frames 11 is fixed a bladder clamping cylinder 10. The piston rod of this bladder clamping cylinder 10 is fixedly secured to a head side of a center post cylinder 9. A flange on the piston rod side of the same center post cylinder 9 is fixedly secured to the lower ring 6, and by actuating the bladder clamping cylinder 10 in a manner which will extend the piston rod (upwards), the center post cylinder 9 and the lower ring 6 are elevated. At this time, the guide ring 5 and the frame 11 are not elevated, but the top end clamp portion of the lower ring 6 is separated from the top end clamp portion of the guide ring 5, so that a lower edge portion of a bladder 31 can be inserted between them (See FIG. 4). Subsequently, by actuating the bladder clamping cylinder 10 in a manner which will retract the piston rod (downwards), the center post cylinder 9 and the lower ring 6 are lowered to clamp the lower edge portion of the bladder 31 between the top end clamp portion of the lower ring 6 and the top end clamp portion of the guide ring 5 (See FIG. 4). Then the cylinders 8 for elevating and lowering the guide ring and the lower ring are actuated in a manner which will extend or retract the piston rods to elevate or lower the guide ring 5 and the lower ring 6 jointly, whereby the clamped bladder 31 can be accommodated within the outer cylinder 4 or elevated up to a tire vulcanizing position.

In addition, to the top end portion of the piston rod of the above-described center post cylinder 9 is fixed secured an upper ring 7 and a top ring 7' is detachably fixed to the upper ring 7 by bolts. After the bolts and the top ring 7' have been detached, an upper edge portion of the bladder 31 is placed on the upper ring 7, the top ring 7' is placed thereon, and the top ring 7' is mounted to the upper ring 7 by means of bolts, whereby the upper edge portion of the bladder 31 can be clamped.

Reference numeral 18 designates a drain extraction pipe, which extends through the lower ring 6 and is elevatable and rotatable relative thereto. And to the top end portion of this drain extraction tube 18 is mounted a drain suction pipe 21 which extends horizontally and has its tip end portion bent downwards. Reference numeral 20 designates a drain extraction outer cylinder. Numeral 19 designates a packing housing mounted to the bottom end portion of the drain extraction outer cylinder 20. The drain extraction pipe 18 extends within the drain extraction outer cylinder 20 and is elevatable and rotatable relative thereto, and a packing 22 is interposed between the drain extraction pipe 18 and the drain extraction outer cylinder 20.

In addition, reference number 28 in FIGS. 1, 2 and 5-9 designates a pair of brackets disposed between the above-mentioned pair of frames 11 and fixed to the respective frames 11. Numeral 35 designates a stopper plate disposed between the same brackets 28 and fixed to the respective brackets. Numeral 16 designates a pair of elevating cylinders (elevation drive means for the drain extraction pipe 18) fixed to the opposite end portions of the stopper plate 35. Numeral 23 in FIGS. 1 and 3(A) designates a disc-shaped block fixed to the bottom end portion of the drain extraction pipe 18. Numeral 24 designates a horizontal bar mounted to the same block 23. Numeral 23' designates two guide rods fixed to the block 23 as suspended therefrom with the horizontal bar 24 placed therebetween. Numeral 25 designates a rotary shaft of a rotary cylinder is (rotary drive means for the drain extraction pipe 18). A neck portion of the rotary shaft 25 is rotatably fitted in holes drilled in the stopper plate 35, and the above-described respective guide rods 23' are slidably fitted in holes drilled in a head portion of the rotary shaft 25.

Figure 2A:
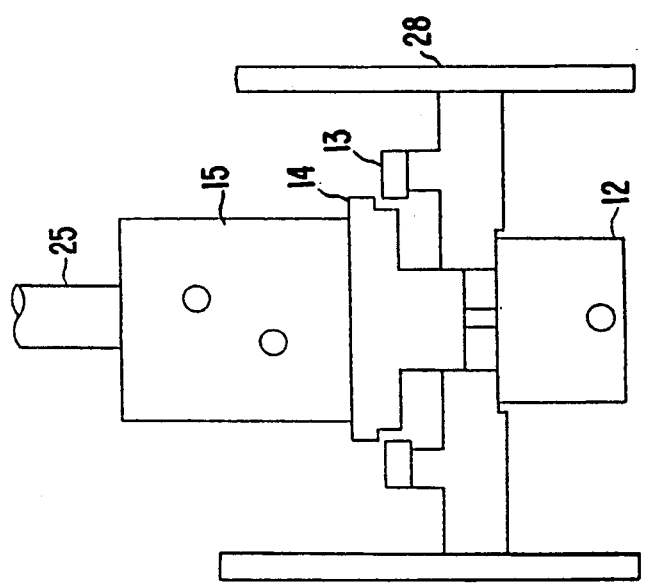
FIGS. 2(A) and 2(B) are schematic diagrams illustrating the operation of an elevation cylinder for raising and lowering an inner gear.
Figure 2B:
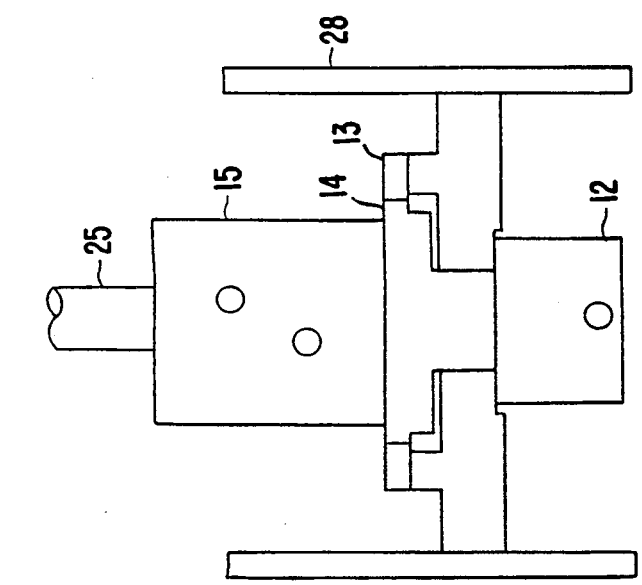

Reference numeral 14 in FIG. 2 designates an inner gear mounted to the body of the above-described rotary cylinder 15. Numeral 13 designates an outer gear mounted to members fixed to the respective brackets 28, and the elevation cylinder 12 is mounted to these same members on the respective brackets 28. When the guide rods 23', the block 23, the horizontal bar 24, the drain extraction pipe 18 and the drain suction pipe 21 have been elevated to the positions shown in FIG. 5 by actuating the cylinders 16, the guide rods 23' have been withdrawn from holes 35' in the stopper plate 35 whereby the rotary shaft 25, the guide rods 23', the block 23, the drain extraction pipe 18 and the drain suction pipe 21 have been brought into a rotatable state. The inner gear 14 is pushed up by actuating the elevation cylinder 12 (See FIG. 2(B). Thus, the inner gear 14 is disengaged from the outer gear 13 and the rotary cylinder 15 is brought into a rotatable state. Subsequently, pressurized oil is fed to one oil chamber in the rotary cylinder to rotate a rotor shaft until a rotor blade comes to a limit position. Then, the rotary cylinder 15, the rotary shaft 25, the guide rods 23', the block 23, the drain extraction pipe 18 and the drain suction pipe 21 are jointly rotated by manual operation to adjust the position of the suction port of the drain in suction pipe 21 to a desired position between the position A and the position B in FIG. 2(B). Next, the inner gear 14 is lowered to mesh with the outer gear 13 by actuating the elevation cylinder 12. Now the position of the suction port of the drain suction pipe 21 has been adjusted.

Figure 10A:
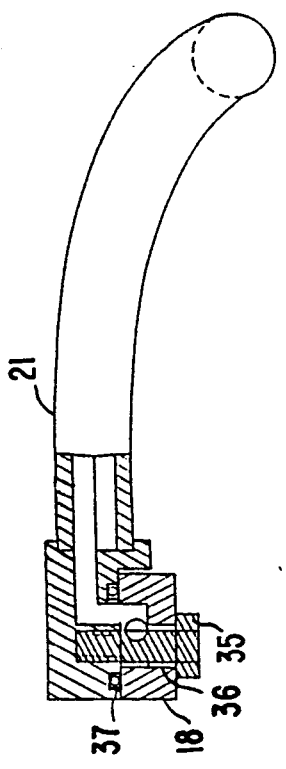
FIG. 10(A) is a plan view, partly in section, of a connection portion between a drain extraction pipe and a drain suction pipe.
Figure 10B:
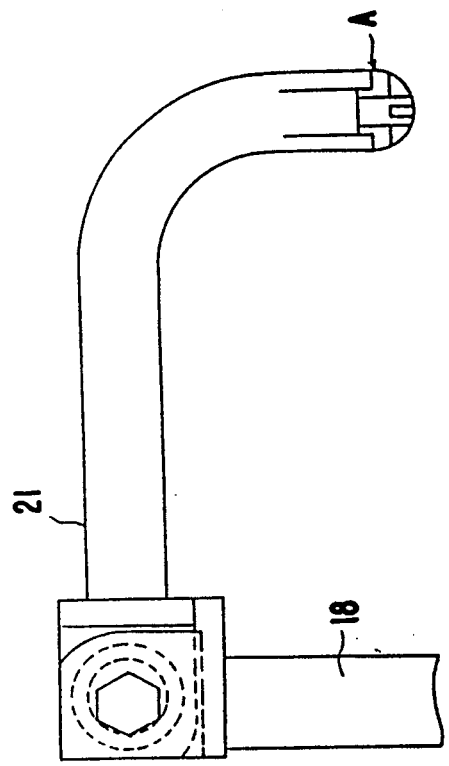
FIG. 10(B) is a side view of the same connection portion.
Figure 10C:
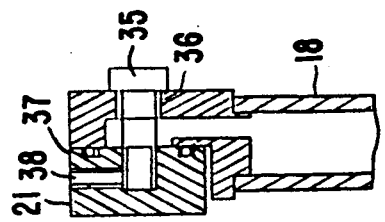
FIG. 10(C) is a vertical cross-sectional side view of the same connecting portion.
Figure 11:
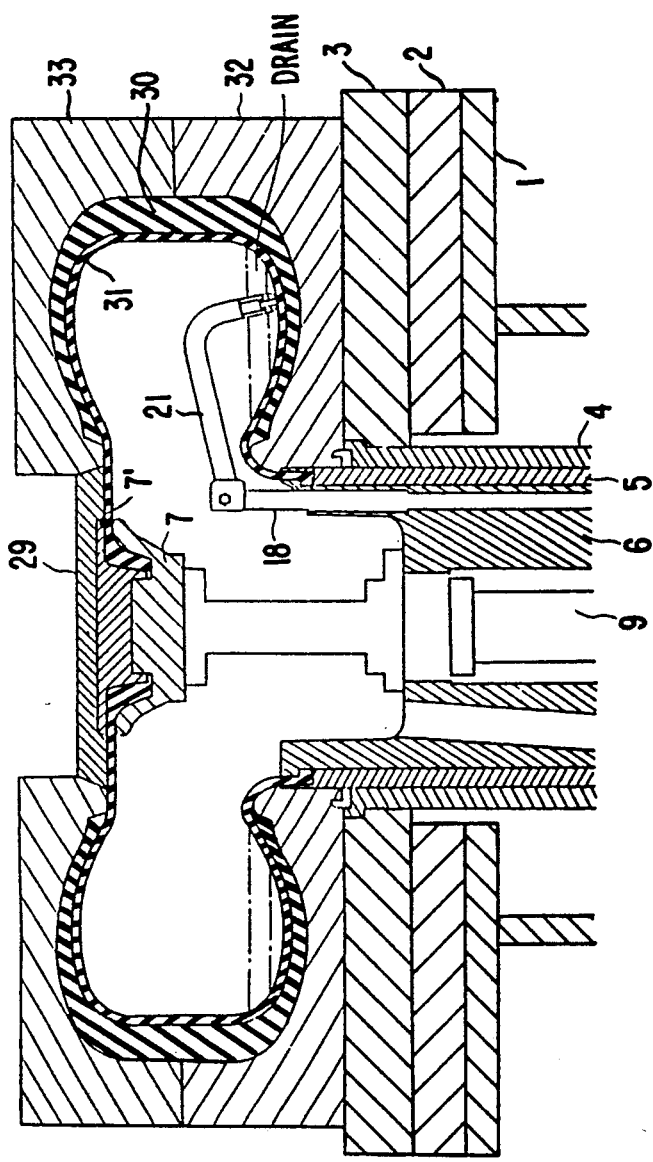
FIG. 11 is a partial cross-sectional view of a vulcanizing machine showing the position of a drain suction pipe upon vulcanizing a tire whose size in the radial direction is small.

FIGS. 10(A), 10(B) and 10(C) illustrate the connecting portion between the drain extraction pipe 18 and the drain suction pipe 21. In these figures, reference numeral 35 designates a bolt for fixedly securing the rear end portion of the drain suction pipe 21 to the top end portion of the drain extraction pipe 18. Numeral 36 designates a bush fitted in a bolt receiving hole in the drain extraction pipe 18. Numeral 37 designates an O-ring for sealing a drain passageway in the drain extraction pipe 18 and the drain suction pipe 21 from the outside. And, numeral 38 designates a set screw for fixing the bolt 35. The drain suction pipe 21 is rotated about the axis of the bolt 35 within a vertical plane to adjust an inclination angle of the drain suction pipe 21. For instance, in the case of vulcanizing a tire 31 whose size in the radial direction is small as shown in FIG. 11, the drain suction pipe 21 is rotated upwards to position the suction port of the drain suction pipe 21 at the deepest portion of the tire side wall. Under this condition, if the drain extraction pipe 18 were elevated, the drain suction pipe 21 would return to the horizontal state due to its own weight.

In addition, reference numeral 17 in FIGS. 1, 3(A), and 5 to 7 designates a limit switch for detecting an out-position. This out-position detecting limit switch 17 is a safety mechanism for allowing actuation of the rotary cylinder 15 only after the out-position (elevated position) of the block 23 has been detected when the cylinders 16 are actuated. Also, reference numeral 26 in FIG. 3(A) designates a stopper on the bracket 28. A stopper bolt 34 fixed to the block 23 would strike against this stopper 26 and a further return of the rotary cylinder 15 is mechanically stopped thereby. Reference numeral 27 designates a return position detecting limit switch for detecting the position of the stopper bolt 34 at such a time.

Figure 6:
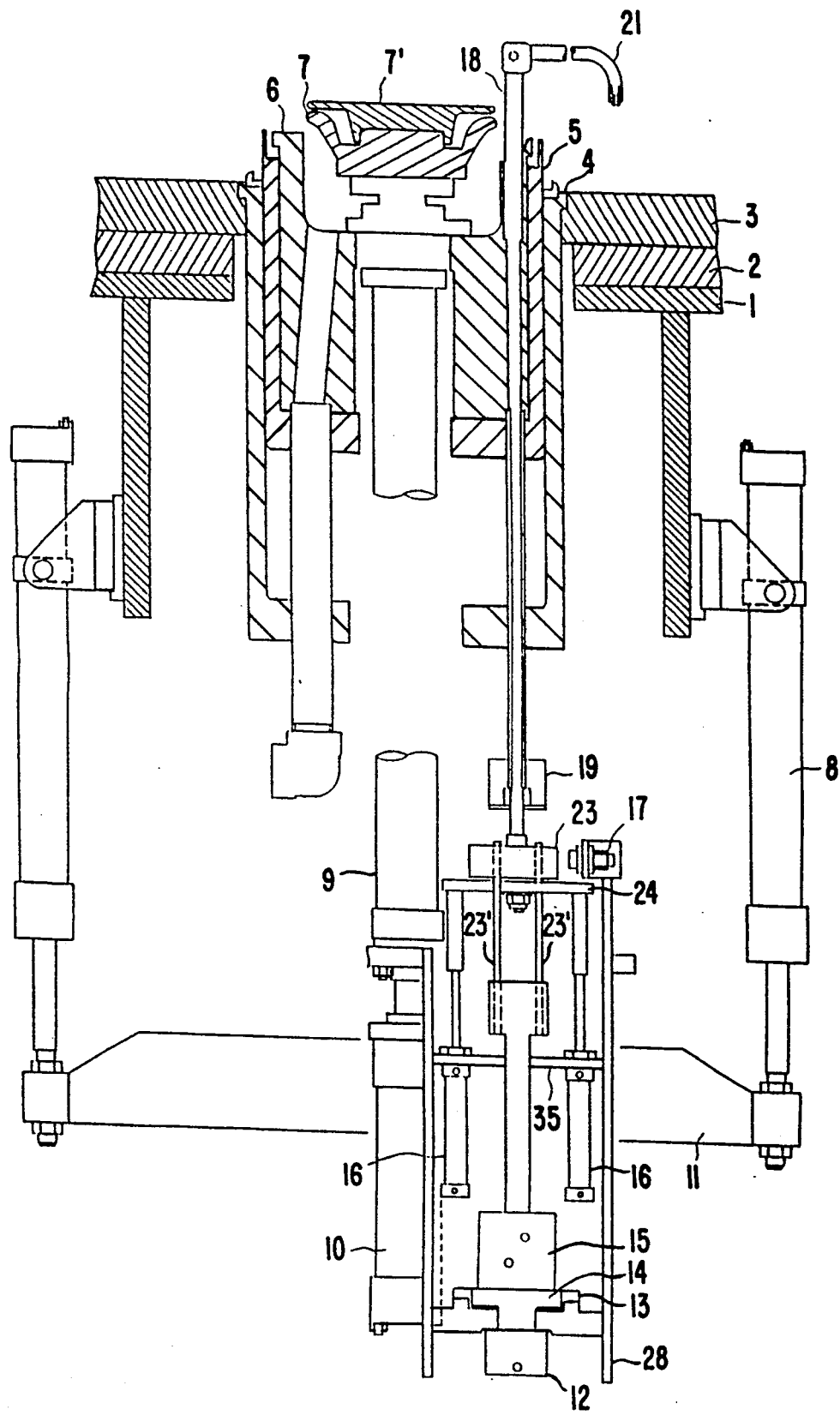
Figure 7:
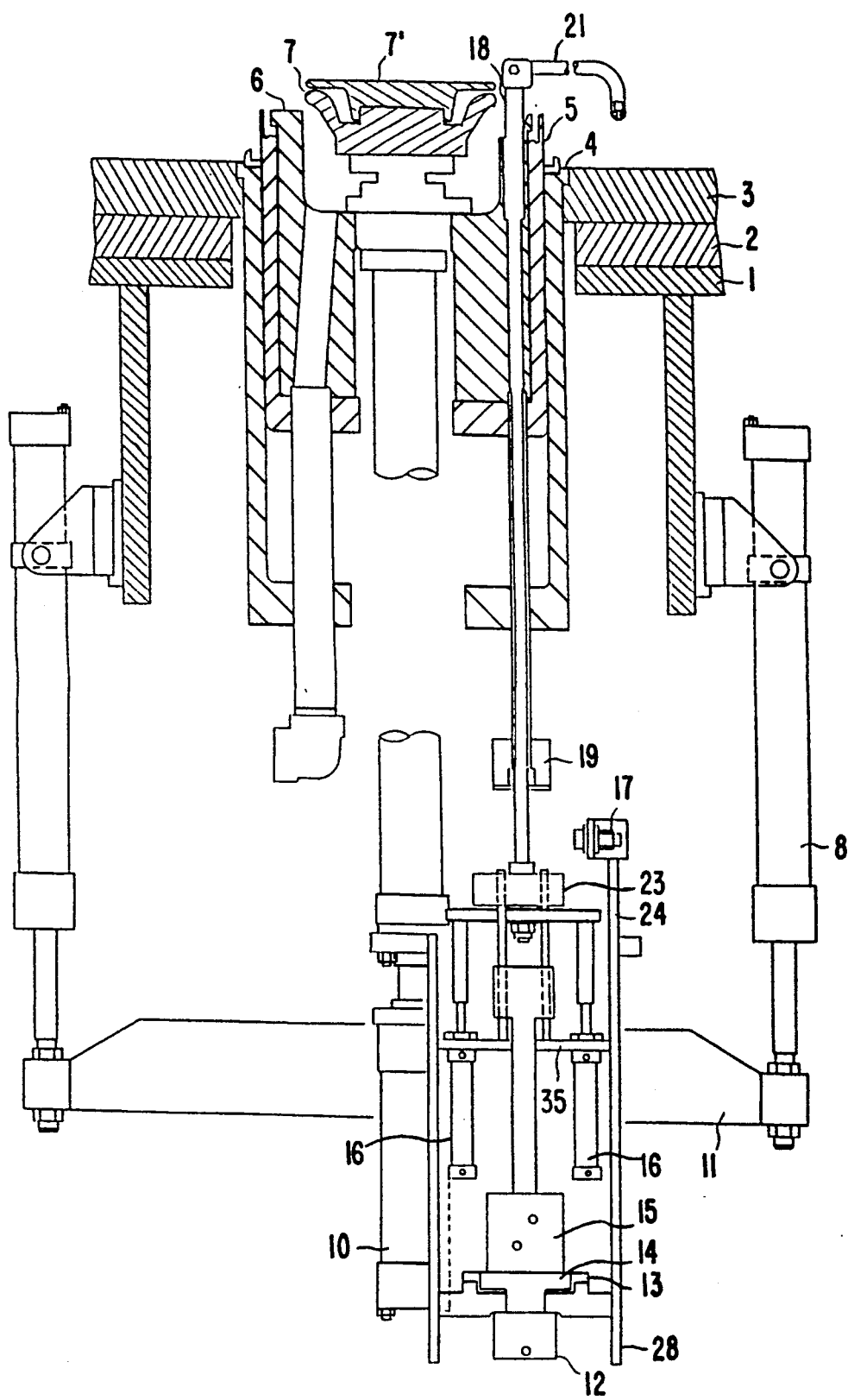
Figure 8:
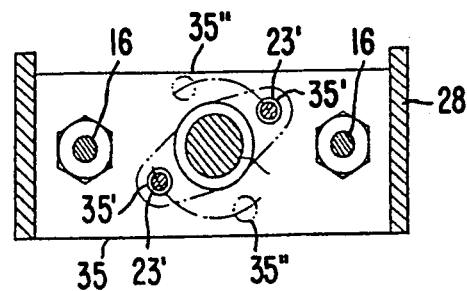
FIG. 8 is a cross-sectional view taken along line VIII—VIII in FIG. 1.
Figure 9:
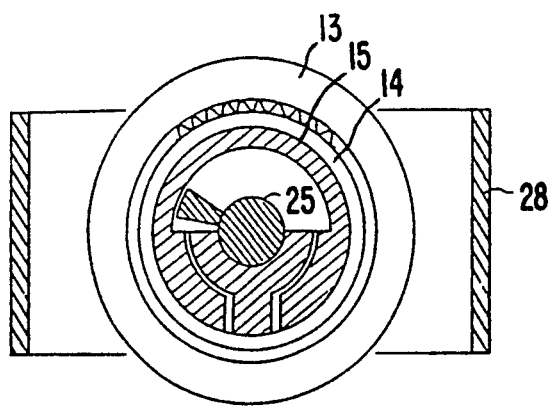
FIG. 9 is a cross-sectional view taken along line IX—IX in FIG. 1.

Next, the operation of the ejector in a tire vulcanizing machine illustrated in FIGS. 1 to 11 will be described in greater detail. When the lower metal mold 32 is fixed on the main body frame 1 via the heat insulating plate 2 and the platen 3, the upper metal mold 33 is pressurized from above by means of a pressurizing mechanism (not shown), the tire 30 is positioned within the lower metal mold 32 and the upper metal mold 33, the bladder 31 is positioned within the tire 30, vulcanizing steam and pressurizing/vulcanizing gas are introduced into the bladder 31 whereby vulcanization has commenced. The drain suction pipe 21 is located at an accommodated position as indicated by solid lines in FIGS. 1 and 3(A). Starting from this condition, by actuating the cylinders 16, the guide rods 23', the block 23, the horizontal bar 24, the drain extraction pipe 18 and the drain suction pipe 21 are elevated to the positions shown in FIG. 5. Thus, the guide rods 23' are withdrawn from the holes 35' in the stopper plate 35 to bring the rotary shaft 23, the guide rods 23', the block 23, the drain extraction pipe 18 and the drain suction pipe 21 into a rotatable state. Subsequently, the rotary cylinder 15 is driven to rotate the rotary shaft 25 of the rotary cylinder 15, the guide rods 23', the block 23, the drain extraction pipe 18 and the drain suction pipe 21 within a limit of rotation of the rotary cylinder 15. That is, the drain extraction pipe 18 and the drain suction pipe 21 are rotated to any desired position within the range of position A to position B shown in FIG. 3(B). This state is shown in FIG. 6. In addition, rotationally moved positions of the guide rods 23' are shown in FIG. 8.

Figure 4:
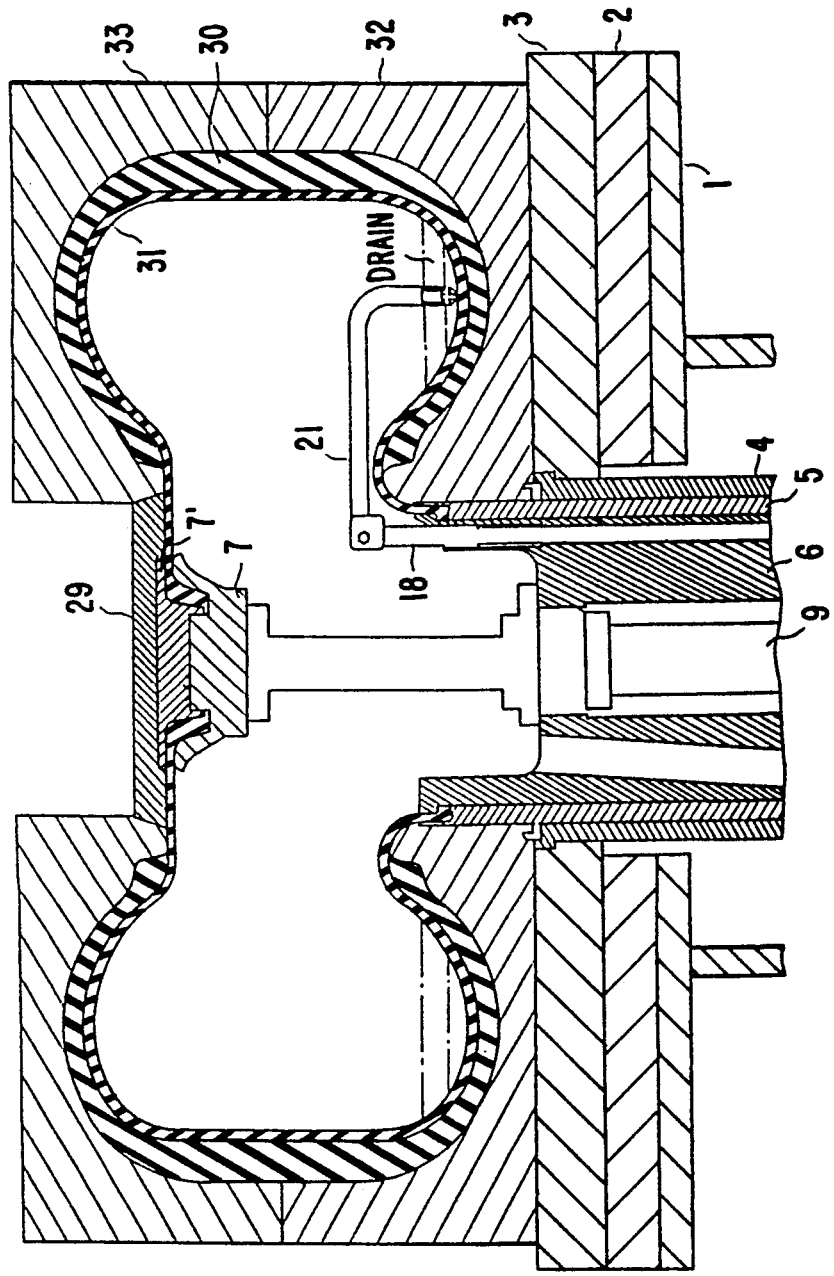
FIG. 4 is a partial cross-sectional view of a vulcanizing machine.
Figure 5:
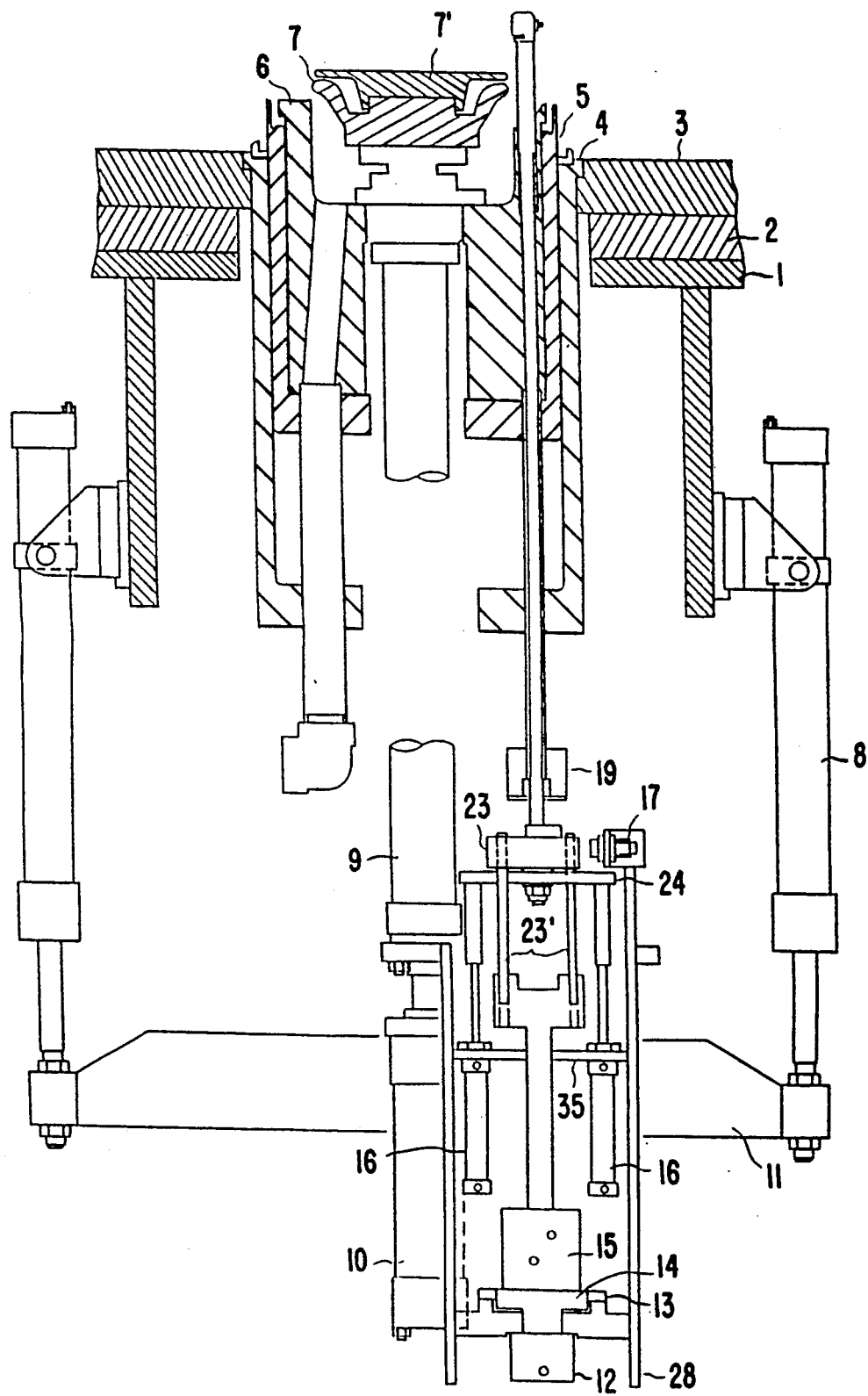
FIGS. 5, 6 and 7 are side views, partly in section, similar to FIG. 1 and illustrating the operation of elevation drive means.

Subsequently, by actuating the cylinders 16, the horizontal bar 24, the block 23, the drain extraction pipe 18 and the drain suction pipe 21 are lowered and the bottom end portions of the guide rods 23' are made to strike against the stopper plate 35 to position the suction port of the drain suction pipe 21 at the deepest portion of the side wall of the tire 30. At this moment, as described previously, the inner gear 14 mounted to the body of the rotary cylinder 15 is meshed with the outer gear 13, whereby the suction port of the drain suction pipe 21 can be maintained at a fixed position. This condition is shown in FIGS. 4 and 7. Under this condition, the condensate of vulcanizing steam produced within the bladder 31 is ejected to the outside of the bladder through the drain suction pipe 21 and the drain extraction pipe 18.

As will be apparent from the detailed description above, in the drain ejector in a tire vulcanizing machine according to the present invention, when a lower metal mold is fixed onto a main body frame, an upper metal mold is pressurized from above, a tire is positioned within the upper and lower metal molds, a bladder is positioned within the tire, vulcanizing steam and pressurizing/vulcanizing gas are introduced into the bladder, whereby vulcanization of the tire is commenced, a drain suction pipe is located at an accommodated position. Starting from this condition, by actuating elevation drive means, the drain extraction pipe and the drain suction pipe are elevated. Subsequently, by actuating rotary drive means (rotary cylinder), a rotary shaft of the rotary cylinder, the drain extraction pipe and the drain suction pipe are rotated to a rotary limit of the rotary drive means (rotary cylinder). Thereafter, an adjustment is effected so that these members may be set at a desired position. Next the drain extraction pipe and the drain suction pipe are lowered by actuating the elevation drive means to position a suction port of the drain suction pipe at the deepest portion of the side wall of the tire, and the condensate of vulcanizing steam produced within the bladder is ejected to the outside of the bladder through the drain suction pipe and the drain extraction pipe. Therefore, even if sizes of a tire are changed, a suction port of a drain suction pipe can be positioned at the deepest portion of the side wall of the tire, and so, there is an advantage in that vulcanizing steam can be ejected thoroughly from the inside of a bladder.

While a principle of the present invention has been described above in connection with one preferred embodiment of the invention, it is a matter of course that all matter contained in the above description and illustrated in the accompanying drawings shall be interpreted to be illustrative and not in a limiting sense.

What is claimed is:

1. In a tire vulcanizing machine having a bladder, and a lower ring and a guide ring between which a lower edge portion of the bladder is clamped, an ejector for ejecting condensate of vulcanizing steam which has accumulated within the bladder to the outside of a tire supported in the machine, said ejector comprising: a drain extraction pipe elevatably and rotatably supported in the machine and extending through the lower ring and the guide ring clamping the lower edge portion of the bladder, a drain suction pipe extending horizontally from the top end portion of said drain extraction pipe and having a tip end portion bent downwards, elevation drive means and rotary drive means operatively connected to said drain extraction pipe for raising nd lowering and rotating said drain extraction pipe in the machine, and a rotary limit adjusting device provided in said rotary drive means for limiting the extent to which said drain extraction pipe is rotatable by said rotary drive means.

2. Apparatus as claimed in claim 1, wherein said rotary drive means comprises a rotary cylinder, and a rotary shaft mounted to the bottom end portion of said drain extraction pipe in an axially movable manner and to the rotary cylinder, and said rotary limit adjusting device comprises an inner gear mounted to said rotary cylinder, an outer gear, and elevator mechanism means for elevating said inner gear, said outer gear mounted to a bracket on a main body frame of the vulcanizing machine via said elevator mechanism means.

3. Apparatus as claimed in claim 1, wherein a rear end portion of said drain suction pipe is mounted to the top end portion of said drain extraction pipe so as to be able to swing up and down about a horizontal axis.

4. Apparatus as claimed in claim 2, wherein a rear end portion of said drain suction pipe is mounted to the top end portion of said drain extraction pipe so as to be able to swing up and down about a horizontal axis.

* * * * *